(12) United States Patent
Hakura et al.

(10) Patent No.: US 8,704,826 B1
(45) Date of Patent: Apr. 22, 2014

(54) PRIMITIVE RE-ORDERING BETWEEN WORLD-SPACE AND SCREEN-SPACE PIPELINES WITH BUFFER LIMITED PROCESSING

(71) Applicant: Nvidia Corporation, Santa Clara, CA (US)

(72) Inventors: Ziyad S. Hakura, Gilroy, CA (US); Robert Ohannessian, Austin, TX (US); Cynthia Allison, Madison, AL (US); Dale L. Kirkland, Madison, AL (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 14/023,309

(22) Filed: Sep. 10, 2013

Related U.S. Application Data

(60) Provisional application No. 61/719,271, filed on Oct. 26, 2012.

(51) Int. Cl.
*G06T 15/00* (2011.01)
*G06T 1/20* (2006.01)

(52) U.S. Cl.
USPC .......................................... 345/419; 345/506

(58) Field of Classification Search
USPC .................. 345/418, 419, 422, 501, 506, 557
See application file for complete search history.

(56) References Cited

U.S. PATENT DOCUMENTS

| | | | |
|---|---|---|---|
| 6,323,860 B1 | 11/2001 | Zhu et al. | |
| 6,535,209 B1 | 3/2003 | Abdalla et al. | |
| 6,697,063 B1 | 2/2004 | Zhu et al. | |
| 7,170,515 B1 | 1/2007 | Zhu et al. | |
| 2008/0150935 A1* | 6/2008 | Van Hook et al. | 345/418 |
| 2010/0110084 A1* | 5/2010 | Leather et al. | 345/506 |

* cited by examiner

*Primary Examiner* — Jacinta M Crawford
(74) *Attorney, Agent, or Firm* — Patterson + Sheridan, L.L.P.

(57) ABSTRACT

One embodiment of the present invention includes approaches for processing graphics primitives associated with cache tiles when rendering an image. A set of graphics primitives associated with a first render target configuration is received from a first portion of a graphics processing pipeline, and the set of graphics primitives is stored in a memory. A condition is detected indicating that the set of graphics primitives is ready for processing, and a cache tile is selected that intersects at least one graphics primitive in the set of graphics primitives. At least one graphics primitive in the set of graphics primitives that intersects the cache tile is transmitted to a second portion of the graphics processing pipeline for processing. One advantage of the disclosed embodiments is that graphics primitives and associated data are more likely to remain stored on-chip during cache tile rendering, thereby reducing power consumption and improving rendering performance.

20 Claims, 8 Drawing Sheets

PRIMITIVE RE-ORDERING BETWEEN WORLD-SPACE AND SCREEN-SPACE PIPELINES WITH BUFFER LIMITED PROCESSING

CROSS-REFERENCE TO RELATED APPLICATIONS

This application claims benefit of U.S. provisional patent application Ser. No. 61/719,271, filed Oct. 26, 2012 and titled "An Approach for Tiled Caching." The subject matter of this related application is hereby incorporated herein by reference.

BACKGROUND OF THE INVENTION

1. Field of the Invention

Embodiments of the present invention relate generally to graphics processing and, more specifically, to primitive re-ordering between world-space and screen-space pipelines with buffer limited processing.

2. Description of the Related Art

Some graphics subsystems for rendering graphics images implement a tiling architecture, where one or more render targets, such as a frame buffer, are divided into screen space partitions referred to as tiles. In such a tiling architecture, the graphics subsystem rearranges work such that the work associated with any particular tile remains in an on-chip cache for a longer time than with an architecture that does not rearrange work in this manner. This rearrangement helps to improve memory bandwidth as compared with a non-tiling architecture.

Typically, the set of render targets changes over time as the rendering of the image progresses. For example, a first pass could use a first configuration of render targets to partially render the image. A second pass could use a second configuration of render targets to further render image. A third pass could use a third set of render targets to complete the final rendering of the image. During the rendering process, the computer graphics subsystem could use any number of different render target configurations to render the final image.

For each render target configuration, graphics objects are first processed in a world space pipeline. The world space pipeline creates graphics primitives associated with the graphics objects. The graphics primitives are created and transmitted by the world space pipeline without regard to the position of the graphics primitives in the screen surface represented by the render targets. The graphics subsystem rearranges the graphics primitives into tile order, where each tile represents a portion of the screen surface. The rearranged graphics primitives are then processed by the screen space pipeline while maintaining application programming interface (API) order.

Although memory allocated for storing tiles is generally designed to hold all the needed graphics primitives for a given render target configuration, certain conditions may cause this tile memory to run out of space. For example, a particular tile could include a large number of very small primitives, such as when one or more graphics objects are finely tessellated. In such cases, the tiling memory could fill with graphics primitives before the entire image is processed in the world space pipeline. In addition, other data associated with the graphics primitives, such as vertex attribute data, may be stored in a general purpose cache. In certain cases, the cache may fill with vertex attribute data or other data associated with the graphics primitives, causing the graphics primitives to be evicted from the tiling memory and the vertex data or other data associated with the graphics primitives to be evicted from the cache. Such evicted data may be written to frame buffer memory and later retrieved.

One drawback to the above approach is that the frame buffer memory is generally off-chip; whereas, the tiling memory and cache memory are generally on-chip. Off-chip memory accesses typically consume more power and take longer to complete. Such increased power consumption may result in shorter battery life, particularly for graphics subsystems placed in mobile devices. In addition, as off-chip accesses to frame buffer memory increase, rendering time increases, resulting in lower graphics performance and reduced visual experience.

As the foregoing illustrates, what is needed in the art is a technique for reducing off-chip memory accessed in graphics subsystem that employs tiling architectures.

SUMMARY OF THE INVENTION

One embodiment of the present invention sets forth a method for processing graphics primitives associated with one or more cache tiles when rendering an image. The method includes receiving a set of graphics primitives associated with a first render target configuration from a first portion of a graphics processing pipeline, and storing the set of graphics primitives in a first memory. The method further includes detecting a condition indicating that the set of graphics primitives is ready for processing, and selecting a cache tile that intersects at least one graphics primitive in the set of graphics primitives. The method further includes transmitting at least one graphics primitive in the set of graphics primitives that intersects the cache tile to a second portion of the graphics processing pipeline for processing.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a computing device configured to implement one or more aspects of the disclosed methods.

One advantage of the disclosed approach is that graphics primitives and associated data are more likely to remain stored on-chip during cache tile rendering, thereby reducing power consumption and improving rendering performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
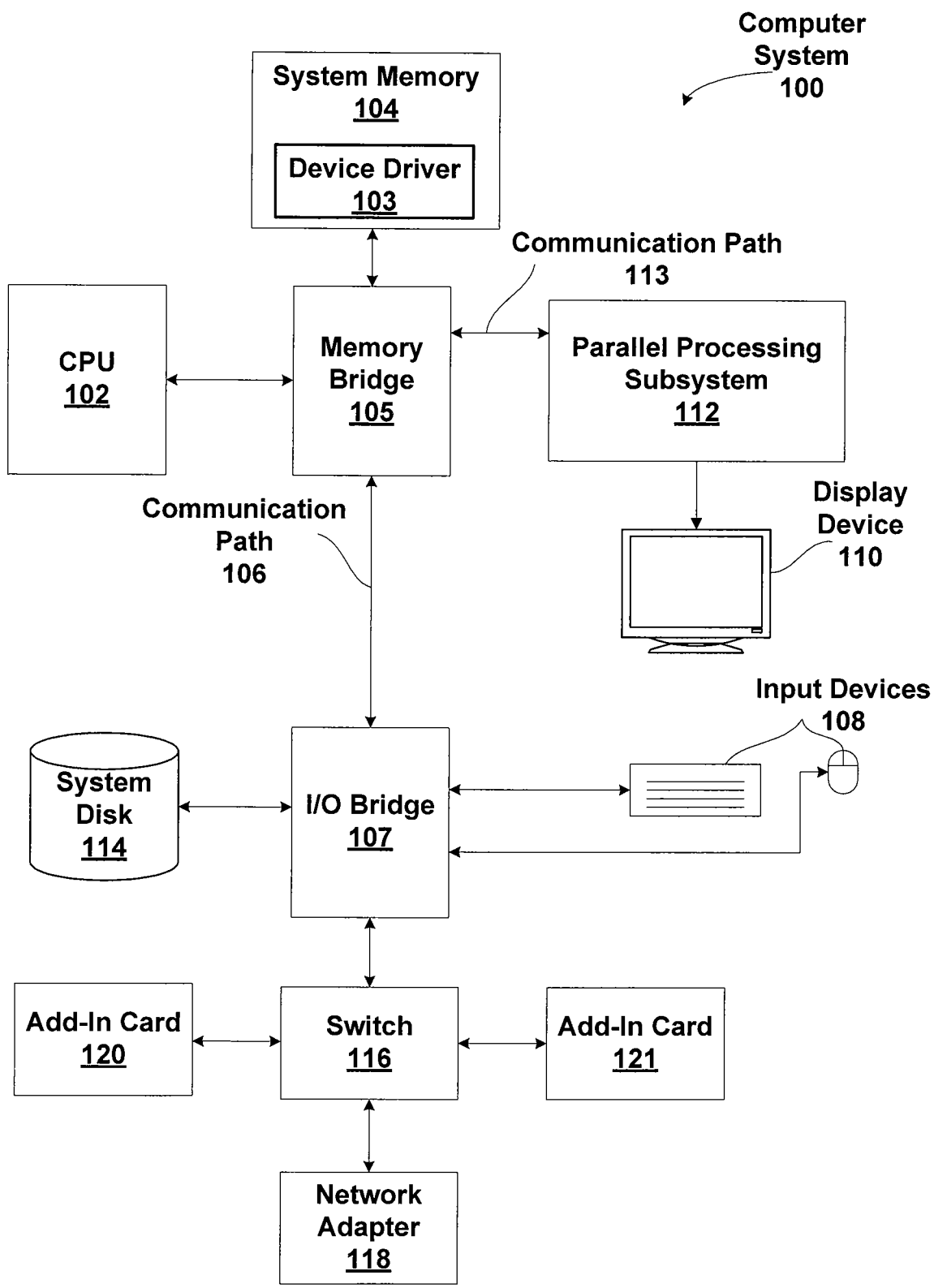
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
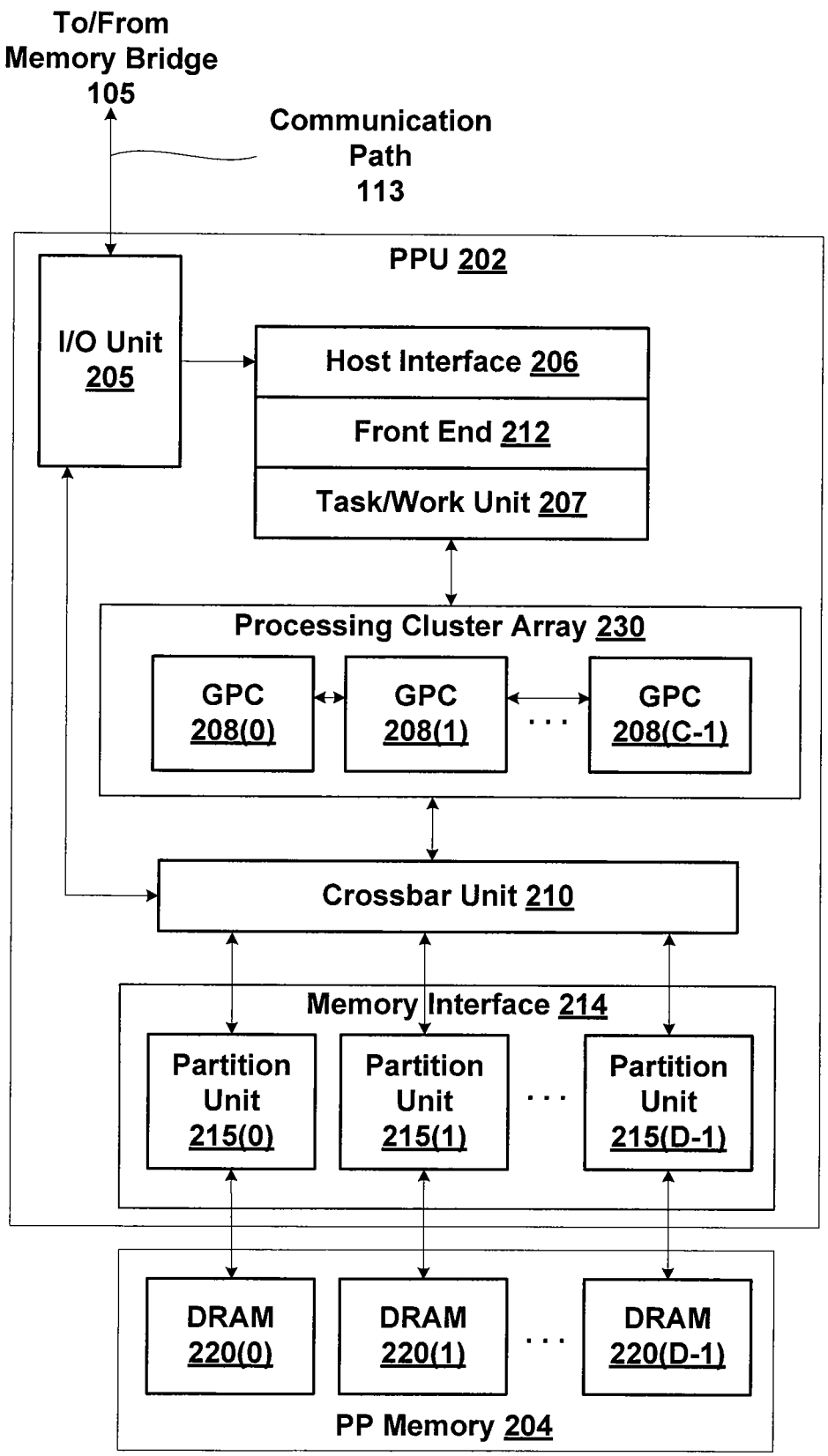
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
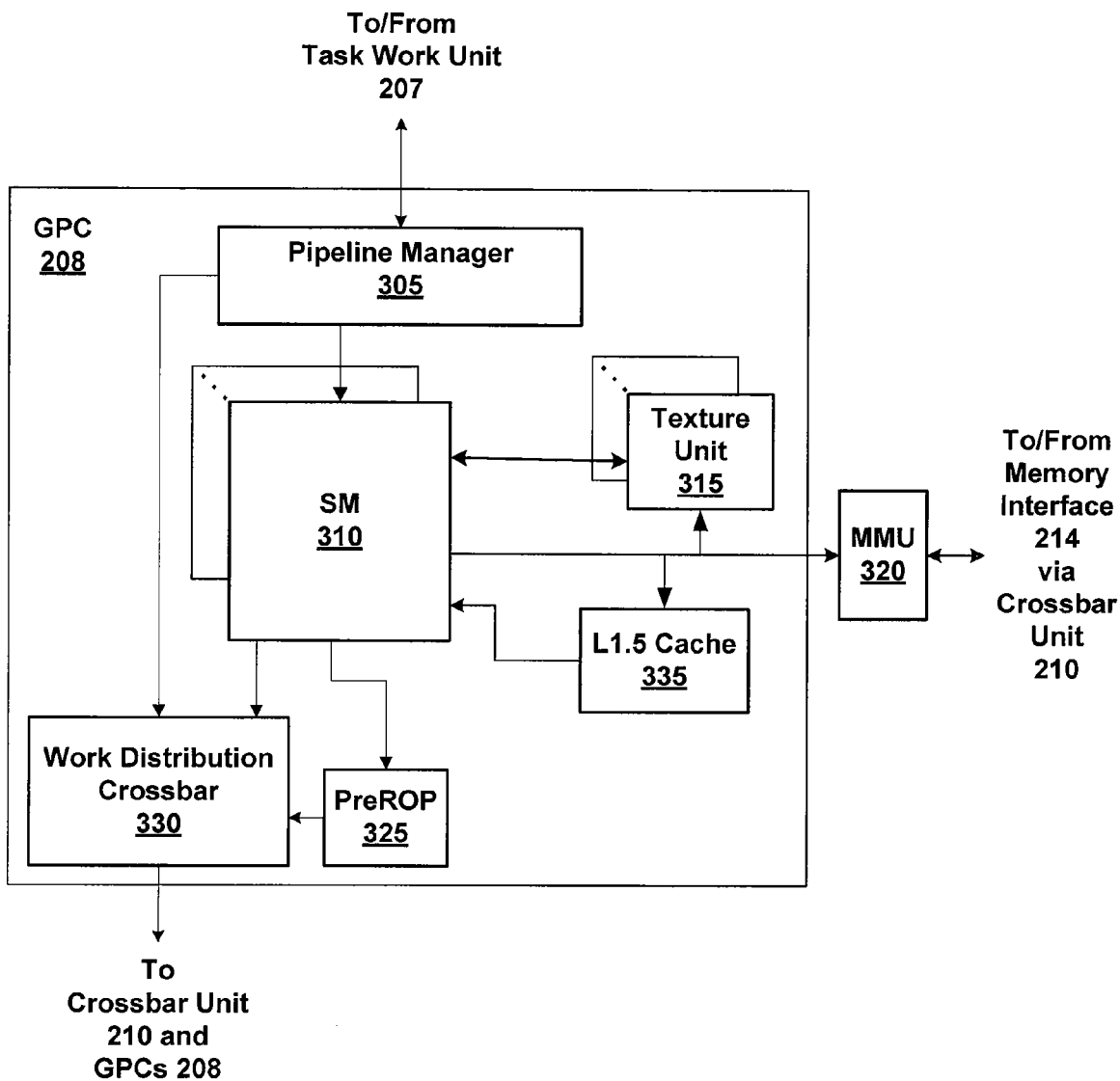
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
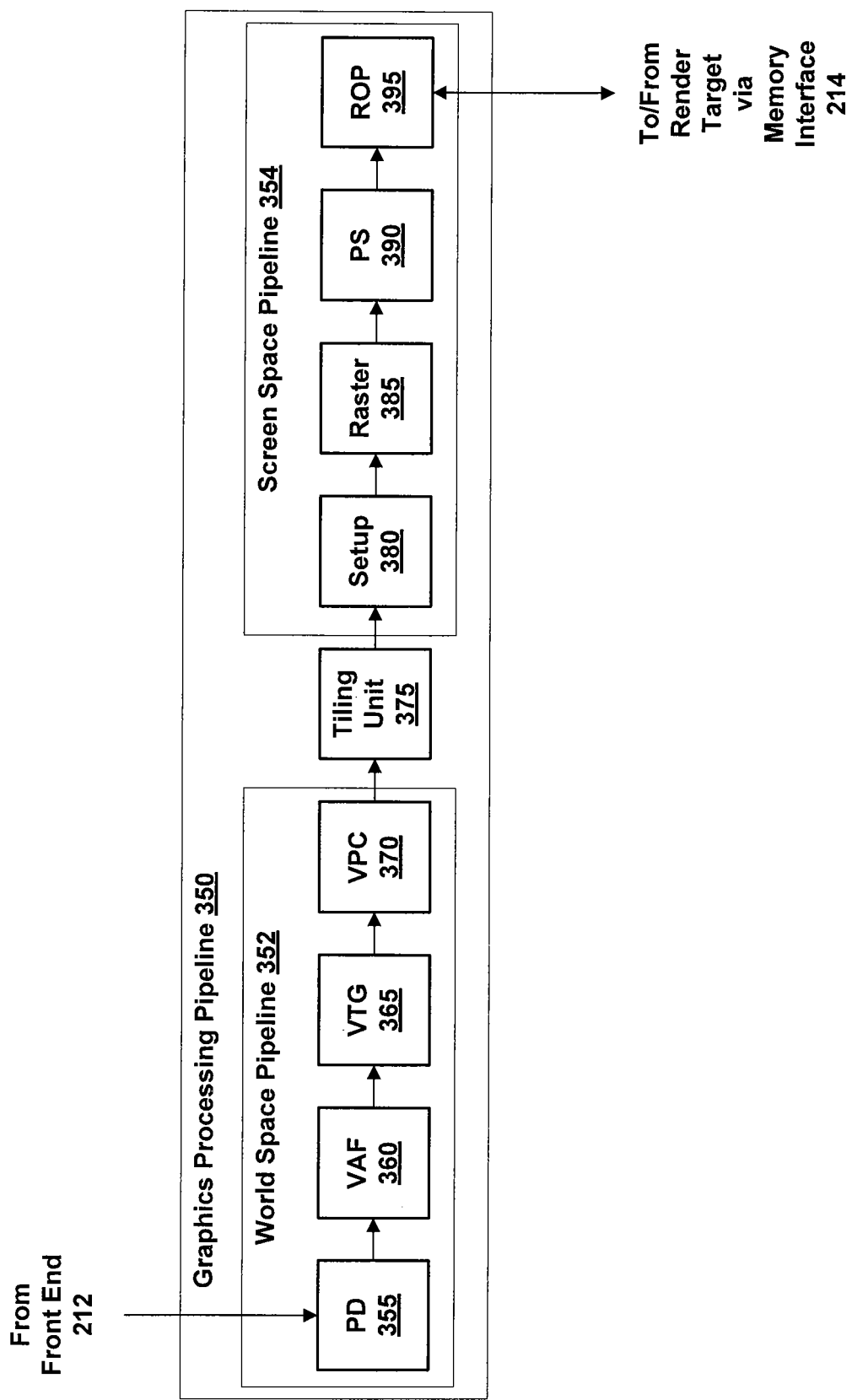
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives, as well as color values, surface normal vectors, and transparency values at each vertex for the graphics primitives, for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
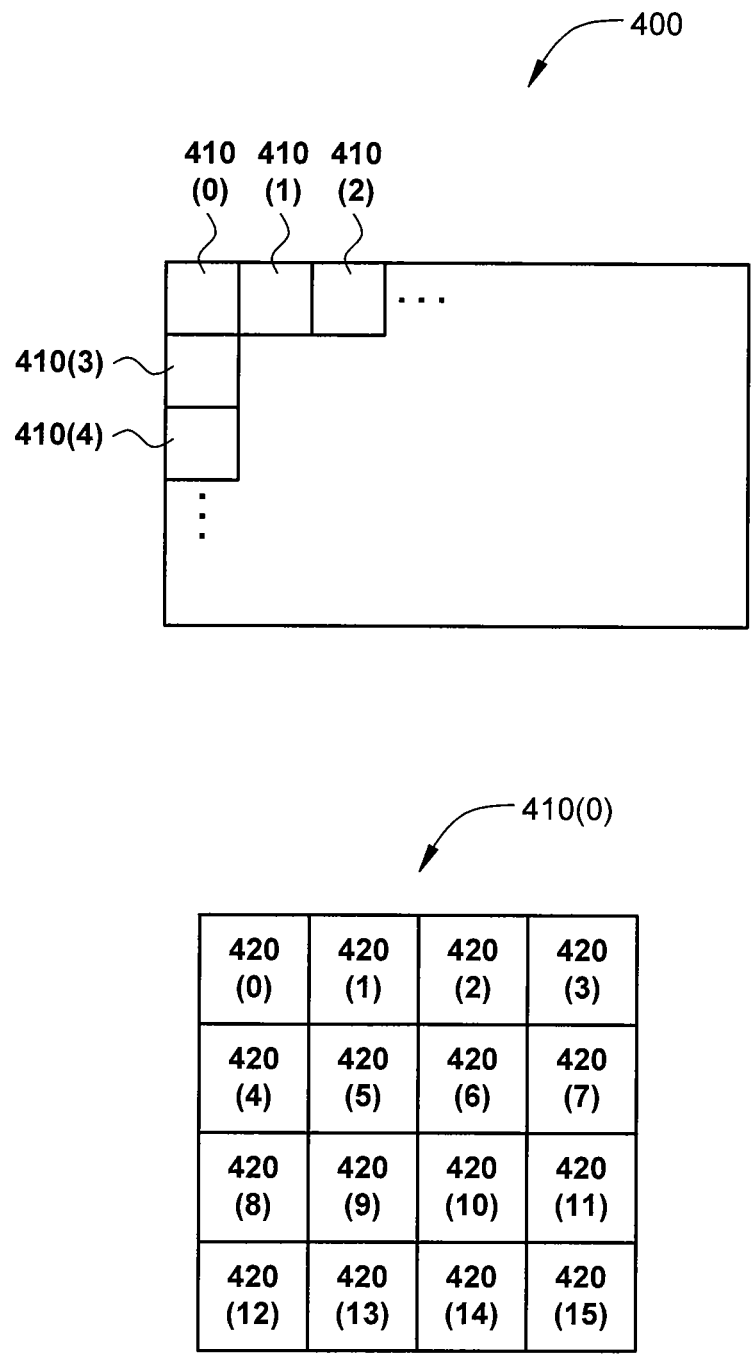
FIG. 4 is a conceptual diagram of a cache tile that the graphics processing pipeline of FIG. 3B may be configured to generate and process, according to one embodiment of the present invention.

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Buffer Limited Tiling

During image rendering, graphics objects are processed once through the world space pipeline 352, producing one or more graphics primitives associated with each graphics object. A bounding box is computed for each graphics primitive or group of graphics primitives. Although described as a bounding "box," any technically feasible bounding primitive may by computed, including, without limitation, a square, a rectangle, an irregular octagon, or any other regular or irregular bounding shape. Each graphics primitive is then tiled, that is, the graphics primitive is associated with one or more screen space tiles, and the graphics primitive data is stored in the tiling unit 375. Each graphics primitive is then processed one or more times by the screen space pipeline 354, based on the number of tiles intersected by the graphics primitive. Accordingly, world space computation is performed once for each graphics object regardless of how many screen cache tiles that the graphics intersects. Because world space computation is performed once, the device driver 103 may access the graphics processing pipeline 350 as a single-pass pipeline. As such, the device driver 103 does not need to loop over the graphics objects and associated vertex attributes and other state attributes more than once, even though the graphics objects may be processed multiple times by the screen space pipeline 354. The tiling memory in the tiling unit 375 is sized to store the graphics primitive data produced by the world space pipeline 352. For some images, however, more data is produced by the world space pipeline 352 than can be stored in the tiling memory and associated cache memories. In such cases, the tiling unit 375 employs buffer-limited processing. Buffer-limited processing is further described below.

Figure 5:
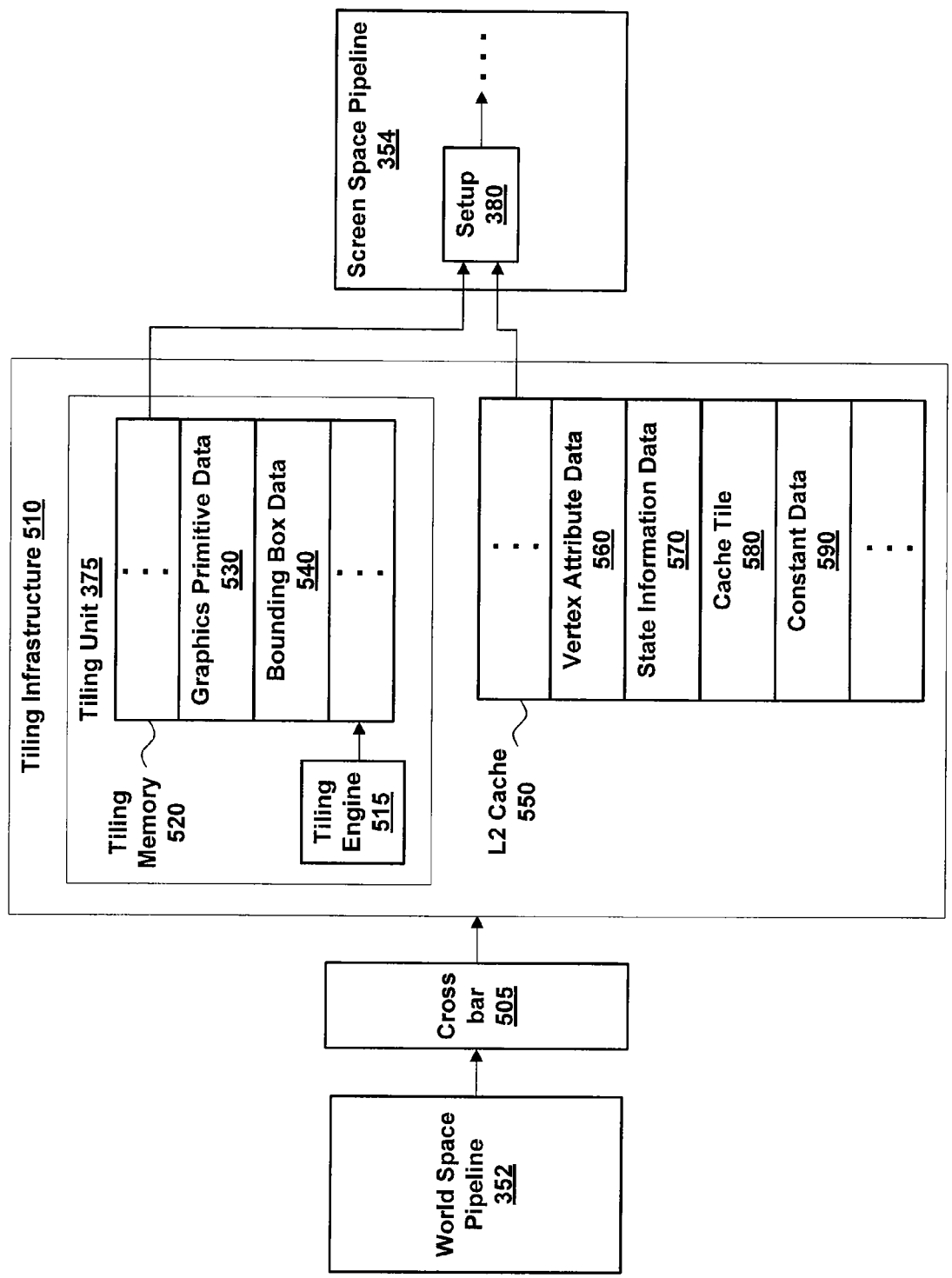
FIG. 5 illustrates a tiling workflow associated with buffer limited tiling, according to one embodiment of the present invention.

FIG. 5 illustrates a tiling workflow 500 associated with buffer limited tiling, according to one embodiment of the present invention. As shown, the tiling workflow 500 includes a world space pipeline 352, a crossbar 505, a tiling infrastructure 510, and a screen space pipeline 354. Except as otherwise described below, the world space pipeline 352 and the screen space pipeline 354 function substantially the same as described above in conjunction with FIG. 3B.

The world space pipeline 352 processes graphics objects associated with an image being rendered in the graphics processing pipeline 350, and creates graphics primitives associated with the graphics objects. The world space pipeline 352 then transmits the graphics primitives to the crossbar 505.

The crossbar 505 receives graphics primitives from the world space pipeline 352 and transmits the graphics primitives to the tiling infrastructure 510. In GPCs 208 that include multiple graphics processing pipelines 350, the GPCs 208 may have multiple world space pipelines 352, tiling infrastructures 510, and screen space pipelines 354. In such cases, the crossbar 505 transmits graphics primitives received from one of the world space pipelines 352 to one, several, or all of the tiling infrastructures, as appropriate.

The tiling infrastructure 510 receives graphics primitives from the crossbar 505 and tiles the graphics primitives into screen space tiles. As shown, the tiling infrastructure 510 includes a tiling unit 375 and an L2 cache 550. Except as further described below, the tiling unit 375 and the L2 cache 550 function substantially the same as described in conjunction with FIGS. 3A-3B.

The tiling unit 375 receives graphics primitives from the crossbar 505 and tiles the data for screen space processing. As shown, the tiling unit 375 includes a tiling engine 515 and a tiling memory 520.

The tiling engine 515 is a processing unit that processes graphics primitives received from the crossbar 505 and stores the processed data in the tiling memory 520. In particular, the tiling engine 515 stores graphics primitive data 530 for each graphics primitive, where the graphics primitive data 530 includes, without limitation, primitive descriptors identifying the type of graphics primitive, such as point, line segment, or triangle; and a pointer to each vertex of the graphics primitive. Graphics primitives are received from the crossbar 505 in the order that the graphics primitives are processed by the world space pipeline 352. The data associated with the graphics primitives are stored in the received order without regard to screen space positions of the graphics primitives.

The pointer to each vertex of a graphics primitive may be specified in any technically feasible manner including, without limitation, a direct memory address, an offset address from a particular base address, or a numeric index. In one embodiment, each vertex pointer consumes four bytes of memory in the tiling memory 520. Each pointer to a graphics primitive vertex points to a location in the L2 cache 550 that specifies the vertex attribute data 560 associated with the vertex. The tiling engine 515 also stores bounding box data 540, where each entry in the bounding box data 540 defines the position and size in screen space of a rectangular bounding box that circumscribes one or more associated graphics primitives. From the bounding box data 540, the tiling engine 515 may determine the set of screen tiles that intersect each graphics primitive.

The tiling memory 520 is a dedicated on-chip memory that stores data for the tiling engine 515, including, without limitation, graphics primitive data 530 and bounding box data 540. The tiling memory 520 operates as a cache memory, where data that does not fit in the tiling memory 520 may be written to and read from an off-chip memory such as a higher level cache or frame buffer memory. As shown, the tiling memory 520 includes graphics primitive data 530 and bounding box data 540.

As described in conjunction with FIG. 3A, the L2 cache 550 is a unified level 2 cache. As shown, the L2 cache 550 includes vertex attribute data 560, state information data 570, one or more cache tiles 580, and constant data 590.

The vertex attribute data 560 is a circular buffer in the L2 cache 550 that includes various attributes associated with the vertices of the graphics primitives processed by the world space pipeline 352. The vertex attribute data 560 is stored with an EVICT_LAST eviction policy in order to increase the likelihood that the vertex attribute data 560 stays resident in the L2 cache 550 for an extended period. In one embodiment, each entry in the vertex attribute data 560 consumes sixty-four bytes of memory in the L2 cache 550. The vertex pointers stored in the graphics primitive data 530 of the tiling memory 520 point to the entries in the vertex attribute data 560.

The state information data 570 includes additional state information as needed by the screen space pipeline 354. In some embodiments, the state information data 570 may include data that is correlated to one or more vertices as stored in the vertex attribute data 560. In some embodiments, the state information data 570 may include data that is not correlated to any vertices stored in the vertex attribute data 560.

The cache tile 580 portion of the L2 cache 550 stores one or more cache tiles as described in conjunction with FIG. 4. As the screen space pipeline 354 processes graphics primitives received from the tiling infrastructure 510, the screen space pipeline 354 accesses associated data in the cache tile 580 portion of the L2 cache 550.

The constant data 590 portion of the L2 cache 550 stores data constants not stored in registers or other memory.

The L2 cache 550 also stores various data (not shown) associated with the parallel processing subsystem 112. The L2 cache 550 operates as a cache memory, where data that does not fit in the L2 cache 550 may be written to and read from an off-chip memory such as the frame buffer memory.

In GPCs 208 that include multiple graphics processing pipelines 350, each GPC 208 may have a screen space pipeline 354 corresponding to each tiling infrastructure 510. In such cases, each tiling infrastructure 510 transmits tiled graphics primitives to a corresponding screen space pipeline 354.

The screen space pipeline 354 receives tiled graphics primitives from the corresponding tiling infrastructure 510 for screen space processing. Specifically, the setup unit 380 in the screen space pipeline 354 receives graphics primitive data 530 and bounding box data 540 from the tiling unit 375 and vertex attribute data 560, state information data 570, and cache tiles 580 from the L2 cache 550. The screen space pipeline 354 then processes the received data in tile order as received from the tiling infrastructure 510.

It will be appreciated that the system shown herein is illustrative and that variations and modifications are possible. In one example, the tiling infrastructure 510 is describes as having a tiling memory 520 and an L2 cache 550 that each include various sections. However, the various sections of the tiling memory 520 and the L2 cache 550 could be stored in any technically feasible memory—on-chip or off-chip, whether or not such a memory is a cache memory. In another example, portions of the tiling memory 520 and the L2 cache 550 could store other data (not shown) as needed by various processing elements, including, without limitation, the tiling unit 375, the GPCs 208, and the CPU 102. In yet another example, the vertex attribute data 560 is described as being stored with an EVICT_LAST eviction policy. However, the vertex attribute data 560 could be subject to any technically feasible cache eviction policy. Alternatively, the vertex attribute data 560 could be subject to no cache policy at all, such as when the vertex attribute data 560 is stored in memory that is not a cache memory.

Each of the graphics primitive data 530, bounding box data 540, vertex attribute data 560, and other data, may be individually selected for various buffering levels, including, without limitation, single-buffering, double-buffering, triple-buffering, and quad-buffering. For example, graphics primitive data 530 and bounding box data 540 could be double-buffered while vertex attribute data 560 could be triple-buffered and constant data could be single-buffered. Buffering levels may be chosen based on any suitable criteria, including, without limitation, the size of the stored data, the criticality of the data, and the duration that the data is expected to remain resident in on-chip memory. Such an approach may increase the likelihood that data related to the processed graphics primitives to stay on-chip for longer periods. In addition, this approach may reduce additional memory traffic that would otherwise be incurred for writing and then reading back vertex attribute data 560 generated by the world space pipeline 352 from frame buffer memory.

As the tiling unit 375 re-orders graphics primitives on a tile-by-tile basis, the tiling unit 375 monitors threshold levels for various data sections associated with tiling, including, without limitation, the graphics primitive data 530, bounding box data 540, the vertex attribute data 560, and constant data 590. Thresholds are individually set for each of these data sections to indicate when the data currently in the tiling memory 520 should be processed prior to overfilling one of the on-chip memories, such as the tiling memory 520 and the L2 cache 550. When a threshold is reached in one or more data sections, the tiling unit 375 initiates a "flush" operation, where the graphics primitives stored in the tiling memory 520 are processed and sent to the screen space pipeline 354 on a tile-by-tile basis. The corresponding entries in the tiling memory 520 are then emptied, freeing the associated tiling memory for receiving additional graphics primitives.

The memory bandwidth for processed geometry may be substantial, particularly in the presence of geometry expansion, such as during tessellation and geometry shading. Moreover, significant quantities of graphics primitive data 530 and vertex attribute data 560 are generated when rendering images that include many small graphics primitives. The approaches described herein may advantageously reduce memory bandwidth during tiled rendering.

In some embodiments, the memory dedicated to storing vertex attribute data 560 in the L2 cache 550 may be programmable via a software application. As such, the vertex attribute data 560 may be sized to allow spill into frame buffer memory. Such an approach may be advantageous where the performance penalty of writing to and reading from frame buffer memory is less than the penalty associated with flushing the tiling memory 520.

Figure 6A:
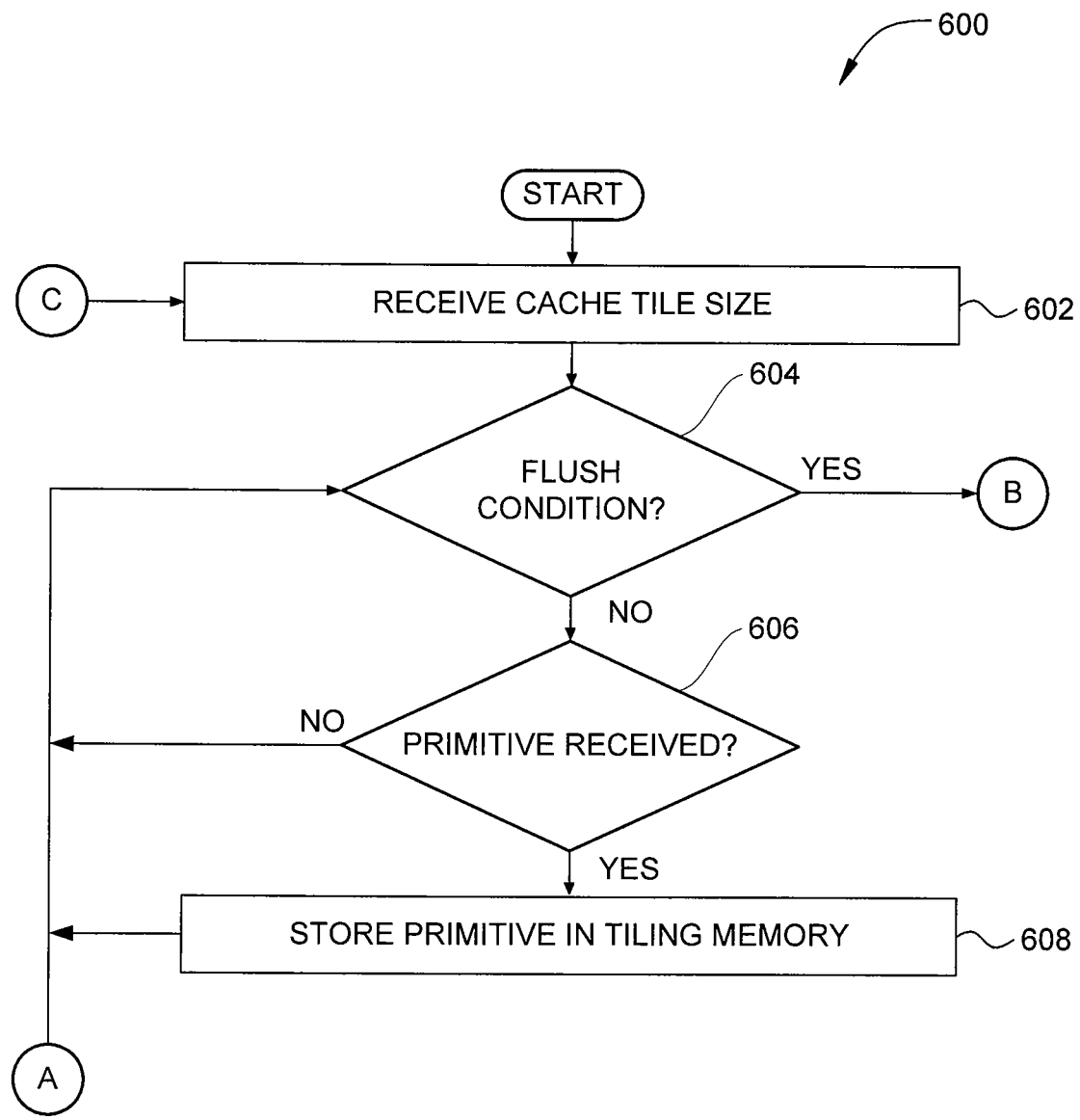
FIGS. 6A-6B set forth a flow diagram of method steps for processing primitives associated with one or more cache tiles when rendering an image, according to one embodiment of the present invention.
Figure 6B:
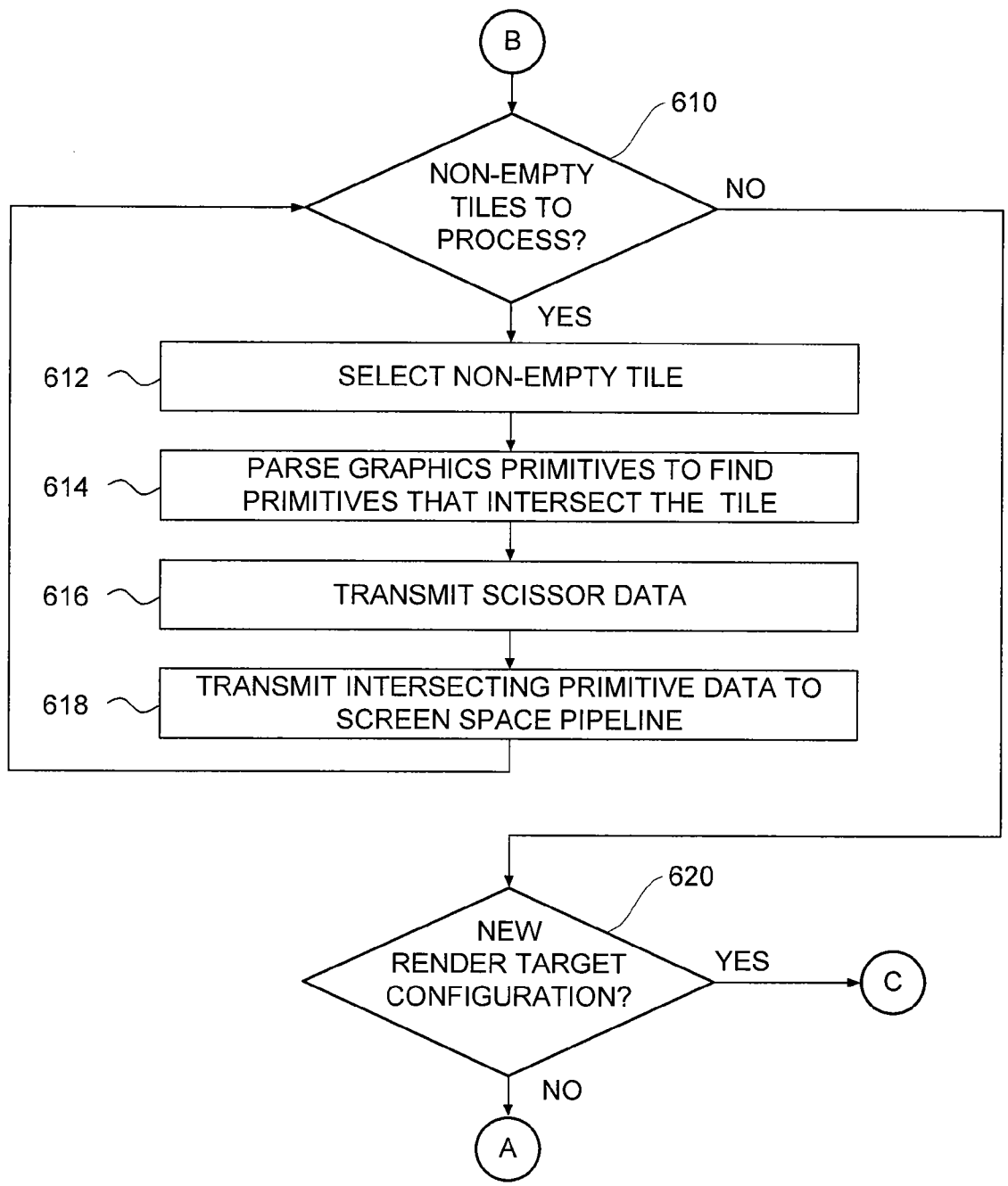

FIGS. 6A-6B set forth a flow diagram of method steps for processing primitives associated with one or more cache tiles when rendering an image, according to one embodiment of the present invention. Although the method steps are described in conjunction with the systems of FIGS. 1-5, persons of ordinary skill in the art will understand that any system configured to perform the method steps, in any order, is within the scope of the invention.

As shown, a method 600 begins at step 602, where the tiling unit 375 receives a new cache tile size corresponding to a new render target configuration. At step 604, the tiling unit 375 determines whether a flush condition is detected. A flush condition occurs for a variety of reasons, including, without limitation, one or more buffers has reached a fill threshold, a flush command is received from an application program, or a new render target configuration is detected. If a flush condition is not detected, then the method 600 proceeds to step 606, where the tiling unit 375 determines whether a new graphics primitive has been received from the world space pipeline 352. If a new graphics primitive has been received from the world space pipeline 352, then the method 600 proceeds to step 608, where the tiling unit 375 stores the received graphics primitive in the tiling memory 520. The method 600 then returns to step 604, described above. If at step 606, however, a new graphics primitive has not been received from the world space pipeline 352, then the method 600 proceeds to step 604, described above.

Returning to step 604, if a flush condition is detected, then the method 600 proceeds to step 610, where the tiling unit 375 determines whether the tiling memory 520 includes non-empty tiles for processing. If the tiling memory 520 includes non-empty tiles for processing, then the method 600 proceeds to step 612, where the tiling unit 375 selects a tile for processing. At step 614, the tiling unit 375 parses the graphics primitive data 530 in the tiling memory 520 to find the graphics primitives that intersect the selected tile. At step 616, the tiling unit 375 transmits scissor data associated with the position and size of the selected tile to the screen space pipeline 354, where the scissor data defines the portion of the intersecting graphics primitives that lie within the selected tile. At step 618, the tiling unit 375 transmits graphics primitive data 530 associated with the intersecting graphics primitives to the screen space pipeline 354. The tiling unit 375 may also transmit bounding box data 540, such as the position and size for a bounding box associated with one or more of the transmitted graphics primitives. The method 600 then returns to step 610, described above.

Returning to step 610, if the tiling memory 520 does not include non-empty tiles for processing, then the method 600 proceeds to step 620, where the tiling unit 375 determines whether the flush condition of step 608 was due to a new render target configuration. If the flush condition was not due to a new render target configuration, then the method 600 returns to step 604, described above. If at step 620, however, the flush condition was due to a new render target configuration, then the method 600 returns to step 602, described above.

In this manner, the tiling unit 375 continuously receives graphics primitives from the world space pipeline 352 and transmits tiled graphics primitives to the screen space pipeline 354. If the tiling memory 520 is double-buffered, then the tiling unit 375 stores the graphics primitives received from the world space pipeline 352 into one buffer and transmits tiled graphics primitives to the screen space pipeline 354 from the other buffer. If the tiling memory 520 is triple-buffered, then the tiling unit 375 stores the graphics primitives received from the world space pipeline 352 into two buffers and transmits tiled graphics primitives to the screen space pipeline 354 from the third buffer. Alternatively, the tiling unit 375 stores the graphics primitives received from the world space pipeline 352 into one buffer and transmits tiled graphics primitives to the screen space pipeline 354 from the other two buffers.

In sum, graphics objects are processed once through the world space pipeline and are stored in a tiling memory between the end of the world space pipeline and the beginning of the screen space pipeline. Geometry primitive data is stored in an on-chip tiling memory while associated data, such as vertex attribute data, is stored in an on-chip cache memory. Various threshold levels limit the fill level for the tiling memory, cache memory, and other associated on chip storage areas. If an on-chip memory fills to a corresponding threshold level, then the tiling memory is flushed, whereby tiling is halted, and the graphics primitives in the tiling memory are processed. Tiling then resumes with respect to the unprocessed graphics primitives. Another feature is that the vertex attribute data in the cache memory are stored with an EVICT_LAST policy, increasing the likelihood that the vertex attribute data stays resident as tiling resumes and additional graphics primitives are processed. In some embodiments, the graphics primitives in tiling memory or vertex attribute data in cache memory may be allowed to "spill over" into frame buffer memory, in cases where the penalty for writing and reading frame buffer memory is determined to be less than the penalty for flushing the graphics primitives in the tiling memory.

One advantage of the disclosed approach is that graphics primitives and associated data are more likely to remain stored on-chip during cache tile rendering, thereby reducing power consumption and improving rendering performance. Another advantage of the disclosed approach is that world space processing is performed once regardless of how many cache tiles on the screen that the geometry falls into. Consequently, the application program and device driver do not need to perform multiple processing passes over the graphics objects and associated state. As a result, application programs and device driver may have a more simplified structure, leading to fewer programming errors and further performance improvement.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A method for processing graphics primitives associated with one or more cache tiles when rendering an image, the method comprising:
receiving a first plurality of graphics primitives associated with a first render target configuration from a first portion of a graphics processing pipeline;
storing the first plurality of graphics primitives in a first memory;
detecting a condition indicating that the first plurality of graphics primitives is ready for processing;
selecting a cache tile that intersects at least one graphics primitive in the first plurality of graphics primitives; and
transmitting the at least one graphics primitive in the first plurality of graphics primitives that intersects the cache tile to a second portion of the graphics processing pipeline for processing.

2. The method of claim 1, wherein detecting the condition comprises detecting that the first memory has filled to a first level associated with a first threshold.

3. The method of claim 1, wherein detecting the condition comprises detecting that a second memory that includes vertex attribute data associated with the first plurality of graphics primitives has filled to a second level associated with a second threshold.

4. The method of claim 1, wherein detecting the condition comprises detecting a flush command associated with the first plurality of graphics primitives issued by a software application.

5. The method of claim 1, wherein detecting the condition comprises detecting that at least a portion of a second plurality of graphics primitives associated with a second render target configuration is ready for processing by the first portion of a graphics processing pipeline.

6. The method of claim 5, further comprising changing a cache tile size from a first value associated with the first render target configuration to a second value associated with a second render target configuration.

7. The method of claim 1, further comprising transmitting scissor data associated with the cache tile to the second portion of the graphics processing pipeline.

8. The method of claim 1, further comprising transmitting a bounding primitive associated with the at least one graphics primitive in the first plurality of graphics primitives that intersect the cache tile to the second portion of the graphics processing pipeline.

9. The method of claim 1, wherein the at least one first graphics primitive in the first plurality of graphics primitives is associated with a cache tile that is stored in a second memory.

10. A graphics subsystem comprising:
a world space graphics processing pipeline;
a screen space graphics processing pipeline; and
a tiling unit coupled to the world space graphics processing pipeline and the screen space graphics processing pipeline and configured to:
receive a first plurality of graphics primitives associated with a first render target configuration from a first portion of a graphics processing pipeline;
store the first plurality of graphics primitives in a first memory;
detect a condition indicating that the first plurality of graphics primitives is ready for processing;
select a cache tile that intersects at least one graphics primitive in the first plurality of graphics primitives; and
transmit the at least one graphics primitive in the first plurality of graphics primitives that intersects the cache tile to a second portion of the graphics processing pipeline for processing.

11. The graphics subsystem of claim 10, wherein detecting the condition comprises detecting that the first memory has filled to a first level associated with a first threshold.

12. The graphics subsystem of claim 10, wherein detecting the condition comprises detecting that a second memory that includes vertex attribute data associated with the first plurality of graphics primitives has filled to a second level associated with a second threshold.

13. The graphics subsystem of claim 10, wherein detecting the condition comprises detecting a flush command associated with the first plurality of graphics primitives issued by a software application.

14. The graphics subsystem of claim 10, wherein detecting the condition comprises detecting that at least a portion of a second plurality of graphics primitives associated with a second render target configuration is ready for processing by the first portion of a graphics processing pipeline.

15. The graphics subsystem of claim 14, wherein the tiling engine is further configured to change a cache tile size from a first value associated with the first render target configuration to a second value associated with a second render target configuration.

16. The graphics subsystem of claim 10, wherein the tiling engine is further configured to transmit scissor data associated with the cache tile to the second portion of the graphics processing pipeline.

17. The graphics subsystem of claim 10, wherein the tiling engine is further configured to transmit a bounding primitive associated with the at least one graphics primitive in the first plurality of graphics primitives that intersect the cache tile to the second portion of the graphics processing pipeline.

18. The graphics subsystem of claim 10, wherein the at least one first graphics primitive in the first plurality of graphics primitives is associated with a cache tile that is stored in a second memory.

19. A computing device, comprising:
- a graphics subsystem, comprising:
    - a world space graphics processing pipeline;
    - a screen space graphics processing pipeline; and
    - a tiling unit coupled to the world space graphics processing pipeline and the screen space graphics processing pipeline and configured to:
    - receive a first plurality of graphics primitives associated with a first render target configuration from a first portion of a graphics processing pipeline;
    - store the first plurality of graphics primitives in a first memory;
    - detect a condition indicating that the first plurality of graphics primitives is ready for processing;
    - select a cache tile that intersects at least one graphics primitive in the first plurality of graphics primitives; and
    - transmit the at least one graphics primitive in the first plurality of graphics primitives that intersects the cache tile to a second portion of the graphics processing pipeline for processing.

20. The computing device of claim 19, wherein detecting the condition comprises detecting that the first memory has filled to a first level associated with a first threshold.

\* \* \* \* \*